March 31, 1931.  H. A. HALL  1,799,133
PROPELLING DEVICE FOR USE IN MARINE PROPULSION ON ANY KIND OF VESSEL
Filed Feb. 23, 1926
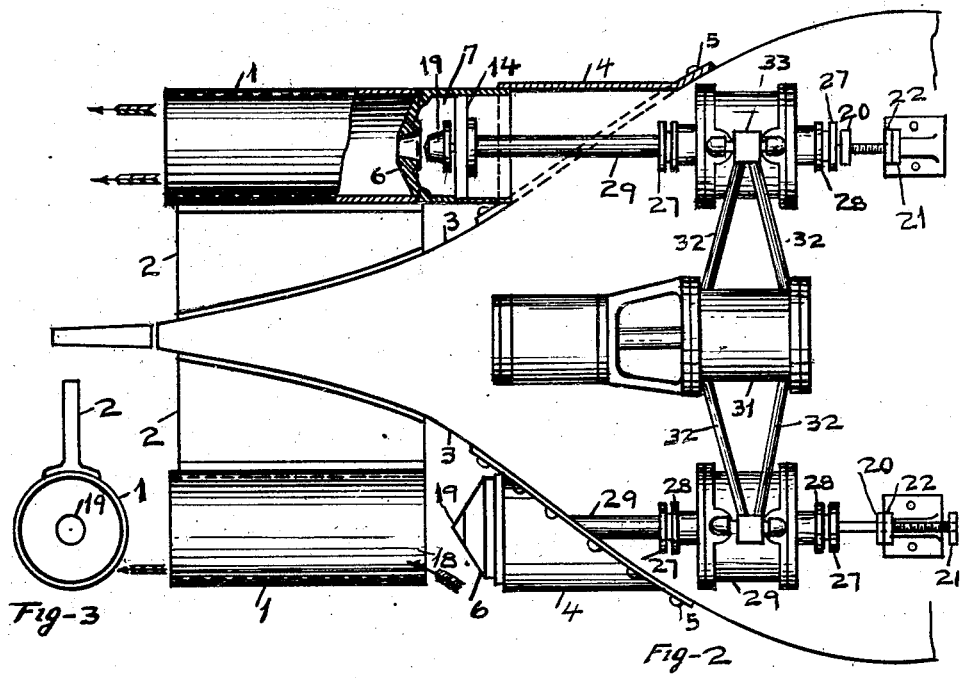
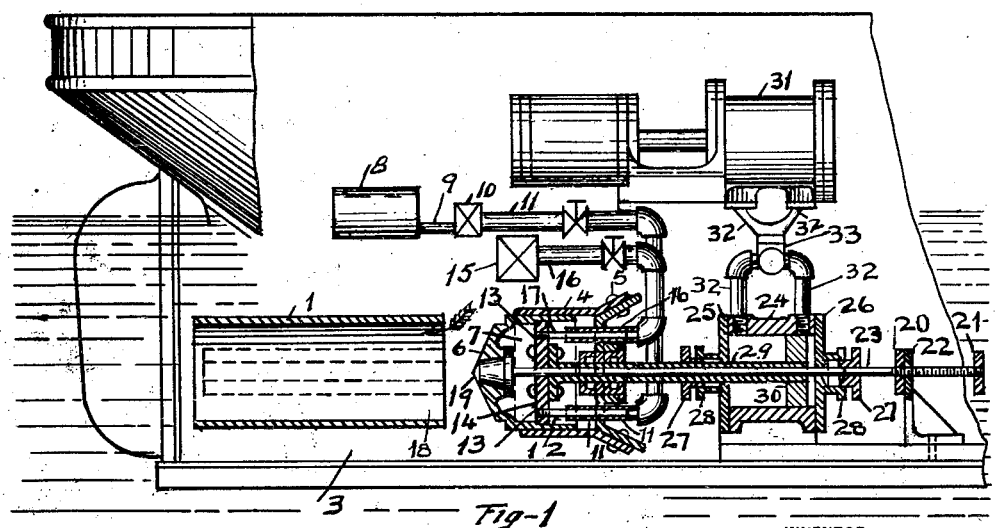
WITNESS
INVENTOR
Hugh Albert Hall Patented Mar. 31, 1931

1,799,133

UNITED STATES PATENT OFFICE

HUGH ALBERT HALL, OF PHILADELPHIA, PENNSYLVANIA

PROPELLING DEVICE FOR USE IN MARINE PROPULSION ON ANY KIND OF VESSEL

Application filed February 23, 1926. Serial No. 90,063.

The invention relates to improvements in propellers of the liquid reaction type, although fundamentally different from anything heretofore attempted, as with my invention the complete working apparatus is placed without or outside of the vessel, whereas attempts heretofore have placed the working force within the vessel, thereby necessitating the bringing of the water for propelling inside the vessel, thus causing a loss in efficiency, which in the past has made the different attempts unsuccessful economically: with my invention, I have overcome this by placing the working mechanism outside and below the water line.

I desire further to show why it is necessary to place the working mechanism outside of the vessel, first the relative speed of the vessel with respect to the stationary body of water, through which the vessel is moving, if we take the water into the hull of the vessel, we must impart to it energy to cause it to take on the same speed as the vessel, by doing this we are taking the energy from the vessel, it is then necessary to use energy to force this body of still water rearwardly thus causing a reacting force to force the vessel forward, it should be understood that in picking up this water, energy was lost, and we must again expend energy which also is lost, in imparting to the water a velocity equal to that of the moving vessel.

By placing the mechanism within the vessel valuable cargo space is lost, and especially from the fact, that to be efficient, the efficiency depends upon a large volume of water, moving at a relatively slow velocity: this may be made clear from the fact that a vessel floating down a stream or river, in which the water is moving at ten knots, in this case cross-sectional area of water forcing the vessel forward is equal to the cross-sectional area of the immersed portion of the vessel, in this case, the speed of the propelling medium is only ten knots the same speed as the vessel which it is propelling, this condition gives the highest efficiency, however it is plain that to convey such a large volume through the hull would take all the space, and leave no room for cargo, to obviate this, attempts have been made to decrease the volume and increase the velocity of the propelling stream, this however lowers the efficiency to a point where the system is economically useless, as the efficiency is lowered by the above mentioned conditions.

To overcome the above mentioned conditions I am placing a new, and efficient mechanism, outside of the vessel, and below the water line, this has many advantages impossible otherwise, because as the water enters the cylindrical receptacle 1, Fig. 1, it is allowed to remain stationary and has not absorbed from the moving vessel, further the placing of the apparatus without the vessel permits of using a large volume of water, thus increasing the efficiency and allowing a much less rate of velocity for the propelling stream, it also greatly reduces friction of long pipes, or water ways.

I will now describe the different views and the cycle of operation: Fig. 1, is a vertical section, while Fig. 2 is a plan view, Fig. 3, is an end view of cylindrical receptacle 1, as shown in Fig. 2.

The cylindrical receptacle 1, with connecting plate 2, are fastened to hull of vessel 3, preferably by electric welding or any other suitable means. The cylinder guide 4, is flanged and fastened to hull 3 as shown at 5, by electric welding or otherwise.

The plunger 6, supported by guide 4, and held in axial alignment with cylindrical receptacle 1, contains a combustion chamber 7, the walls preferably being lined with a refractory material, said combustion chamber receives its supply of fuel (which may be either a liquid or gas) from tank 8, Fig. 1, through suction pipe 9, of pipe 10, which is forced through pipe 11, thence through pipe 12, said pipe is fastened by any suitable means to partition plate 14, in hole 13, and has a reciprocating motion with plunger 6. The other end has a sliding fit within pipe 11, which may be well fitted to prevent leakage of oil or gas, or it may have a suitable packing.

The air supply for combustion chamber is received from air pump 15, shown at Fig. 1, through pipe 16, thence through pipe 17, said pipe is fastened by welding or otherwise to partition plate 14, of combustion chamber 7, the other end of said pipe has a sliding fit within pipe 16.

The fuel supply and air may be continuous or intermittent, and ignition may be caused by the temperature of air at very high pressure or by an electric spark.

The plunger 6, which is rigidly attached to partition plate 14, has a reciprocating motion, the object of which when in its extreme forward position admits water to flow into the cylindrical receptacle 1, at end 18, as shown. On its extreme rearward stroke it completely closes end of cylindrical receptacle 1, as shown in Fig. 2, at which moment valve 19, is made to open by stop collar 21, as shown in Fig. 2, coming in contact with the stationary pedestal 22; when this position is reached the combustion chamber 7, being opened, the gases are released under high pressure thus forcing the water contained in cylindrical receptacle 1, rearwardly, thus causing a reaction to force the ship forward, on the return stroke of plunger 6, the valve 19, is closed by stop collar 20, coming in contact with pedestal 22, the stop collars 20 and 21, are secured to the shaft 23, by a screw thread or other suitable means, the other end of said shaft is fastened in valve 19, by any suitable means.

Plunger 6, is moved through the medium of a hydraulic cylinder (or other suitable mechanism) as shown by 24 in Fig. 1, having flange covers 25 and 26 with stuffing boxes 27 and 28, as shown. A hollow piston rod 29, containing a piston 30, and fastened thereon, and flanged on the opposite end and secured thereto by suitable means, preferably a screw thread, to partition plate 14, by rivets as shown or any other suitable fastener, the partition plate 14 is fastened to inside of plunger 6, by a forced fit or other suitable means, the piston is made to reciprocate by a liquid, preferably water, by a pump 31, through pipes 32, said water passing through the 2-way valve 33, which automatically changes the direction of flow of water, as to cause suction and delivery to be interchangeable between the pipes 32, as shown in Fig. 1.

I do not limit myself to the hydraulic cylinder and pump as a means of power, as I may use a crank, a slotted yoke, or any other suitable mechanism with which to move plunger backward and forward.

I am further not limited to the number of cylindrical receptacles or mechanisms which I may place outside the vessel as I may use one or as many as I choose.

I claim:

1. The combination in a vessel propelling device having a water receiving receptacle, means for automatically admitting water to said receptacle during definite intervals of time, means for closing said receptacle, a combustion chamber, means for moving same, means for supplying said combustion chamber, with a combustible mixture, and means for exploding said mixture at a predetermined position of said combustion chamber, and means for said explosion to pass through said receptacle, thus forcing water out of said receptacle.

2. The combination in a vessel propelling device, having a water receiving receptacle, a plunger containing an explosive mixture, said plunger having a motion which closes said receptacle, means for supplying said plunger with an explosive mixture, and having means for firing said mixture when plunger has closed said water receptacle.

3. The combination of a vessel propelling device, having a water reeciving receptacle, rigidly attached to hull, an operating plunger for intermittently admitting water to pass through receptacle, said plunger having a combustion chamber for carrying an explosive mixture, means whereby said combustion chamber receives a supply of combustible mixture, means for automatically firing said mixture, when plunger is in a predetermined position, means for automatically releasing said mixture into water receptacle, and means so that the total force of the explosion will be in a direction opposite to the direction of the vessel all substantially as described.

4. The combination in a vessel propelling device, a water receiving receptacle outside of vessel, means for admitting water to said receptacle without changing water from a state of rest, a movable combustion chamber, and means to move the combustion chamber to close the water receptacle, and means to explode gases within said receptacle, and means for conveying explosive mixture to said combustion chamber.

5. The combination in a vessel propelling device, having a plurality of water receiving receptacles outside of vessel, means for admitting water to said receptacles without changing water from a state of rest, a movable combustion chamber, and means to move the combustion chamber to close the water receptacle, and to explode gases within said receptacle, and means for conveying explosive mixture to said combustion chamber.

6. The combination in a vessel propelling device, having a water receiving receptacle, means for automatically admitting water to said receptacle, during definite intervals of time, means for closing said receptacle, a combustion chamber, means for moving same, means for supplying said combustion chamber with a combustible mixture, and means for exploding said mixture at a predetermined position of said combustion chamber, and means for said explosion to pass through said receptacle, thus forcing water out of said receptacle.

7. The combination in a vessel propelling device, having a water receiving receptacle, a plunger containing an explosive mixture, and means to move the combustion chamber to close the water receptacle, means for supplying said chamber with an explosive mixture, and means for firing said mixture when plunger has closed said water receptacle.

8. The combination of a vessel propelling device, having a water receiving receptacle, rigidly attached to hull, an operating plunger for intermittently admitting water to pass through receptacle, said plunger having a combustion chamber for carrying an explosive mixture, and means whereby said combustion chamber receives a supply of combustible mixture when plunger is in a predetermined position, means for automatically releasing said mixture into water receptacle, and means so that the total force of the explosion will be in a direction of the vessel, all substantially as subscribed.

HUGH ALBERT HALL.